(12) United States Patent
Nimnual et al.

(10) Patent No.: US 8,611,692 B2
(45) Date of Patent: Dec. 17, 2013

(54) AUTOMATED IMAGE REGISTRATION WITH VARIED AMOUNTS OF A PRIORI INFORMATION USING A MINIMUM ENTROPY METHOD

(75) Inventors: Somkid Nimnual, Rocky Point, NY (US); Steven J. Cento, Farmingville, NY (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 232 days.

(21) Appl. No.: 13/245,177

(22) Filed: Sep. 26, 2011

(65) Prior Publication Data

US 2013/0077891 A1   Mar. 28, 2013

(51) Int. Cl.
G06K 9/36   (2006.01)
G06K 9/32   (2006.01)

(52) U.S. Cl.
USPC .......................................... 382/276; 382/294

(58) Field of Classification Search
USPC ........................... 382/276, 294, 280, 298, 240
See application file for complete search history.

(56) References Cited

U.S. PATENT DOCUMENTS

| | | | |
|---|---|---|---|
| 6,343,143 B1 | 1/2002 | Guillemaud et al. | |
| 6,775,405 B1 | 8/2004 | Zhu | |
| 6,848,087 B2 | 1/2005 | Sengupta et al. | |
| 7,263,243 B2 | 8/2007 | Chen et al. | |
| 7,561,757 B2 * | 7/2009 | Sabuncu et al. | 382/294 |
| 2005/0220363 A1 | 10/2005 | Oldroyd | |
| 2006/0110071 A1 * | 5/2006 | Ong et al. | 382/294 |
| 2006/0120583 A1 * | 6/2006 | Dewaele | 382/128 |
| 2006/0215935 A1 | 9/2006 | Oldroyd | |
| 2009/0010540 A1 | 1/2009 | Mullick et al. | |
| 2009/0067752 A1 | 3/2009 | Lee et al. | |

FOREIGN PATENT DOCUMENTS

WO   03083779 A2   10/2003
WO   2007133620   11/2007

OTHER PUBLICATIONS

Fan et al, "Improved Approach for Image Registration Based on Wavelet Transform", Computer Engineering, Mar. 1, 2010 vol. 36, No. 5 (pp. 1-13 translated).*

Roshni VS, Dr. K Revathy, Using Mutual Information and Cross Correlation as Metrics for Registration of Images, Journal of Theoretical and Applied Information Technology, 2005-2008, pp. 474-481.

George Wolberg and Siavash Zokai, Robust Image Registration Using Log-Polar Transform, Department of Computer Science, City College of New York, Sep. 2000, 4 pages.

(Continued)

*Primary Examiner* — Yon Couso
(74) *Attorney, Agent, or Firm* — Robert P. Lenart, Esq.; Pietragallo Gordon Alfano Bosick & Raspanti, LLP

(57) ABSTRACT

An image registration method includes: providing a reference image and a source image; using a wavelet transformation to produce a transformed reference image and a transformed source image; using the transformed reference image and the transformed source image to estimate affine transform parameters; using the reference image, the source image, and the affine transform estimates to maximize normalized mutual information between the reference image and the source image; and using the normalized mutual information to perform sub-pixel geo-spatial registration of the reference image and the source image to produce an output image. An apparatus that performs the method is also provided.

11 Claims, 1 Drawing Sheet

(56) References Cited

OTHER PUBLICATIONS

Josien P. W. Pluim, J.B. Antoine Maintz and Max A. Viergever, Image Registration by Maximization of Combined Mutual Information and Gradient Information, IEEE Transactions on Medical Imaging, Image Sciences Institute, University Medical Center Utrecht, Heidelberglaan, 2000, pp. 1-6.

Zitova, Barbara et al., "Image Registration Methods: A Survey", Image and Vision Computing, Elsevier, Oct. 1, 2003, pp. 977-1000, vol. 21, No. 11.

Cole-Rhodes Arlene, A. et al., "Multiresolution Registration of Remote Sensing Imagery by Optimization of Mutual Information Using a Stochastic Gradient", IEEE Transaction on Image Processing, Dec. 1, 2003, pp. 1495-1511, vol. 12, No. 12.

Zhao, Tongzhou et al., "An Approach of Remote Sensing Images Registration by Using a New Feature-Based Technique", Proceedings of SPIE, Oct. 30, 2009, pp. 749423-1-749423-6, vol. 7494.

Fan, Jin-jin- et al., "Improved Approach for Image Registration Based on Wavelet Transform", Computer Engineering, Mar. 1, 2010 vol. 36, No. 5. (abstract only).

Suma, Dawn et al., "Remote Sensing Image Registration Techniques: A Survey", Image and Signal Processing, Department of Computer Science Engineering and Information Technology, Department of Mathematics, Jaypee Institute of Information Technology, Jun. 30, 2010, pp. 103-112.

\* cited by examiner

AUTOMATED IMAGE REGISTRATION WITH VARIED AMOUNTS OF A PRIORI INFORMATION USING A MINIMUM ENTROPY METHOD

BACKGROUND

Image registration refers to the geometric alignment of a set of images. The set may consist of two or more digital images taken of a single scene at different times, from different sensors, or from different viewpoints. The goal of registration is to establish geometric correspondence between the images so that they may be transformed, compared, and analyzed in a common reference frame. This is of practical importance in many fields, including remote sensing, medical imaging, and computer vision.

In remote sensing image registration of satellite images from orbital sensors, intrinsic problems occur because of both geometric error and radiometric distortion misalignment of two or more images. Geometric errors can be caused by position, size and orientation of a pixel being altered during the acquisition process. The causes of such geometric errors include earth rotation during the acquisition process, land curvature, platform speed and altitude variations, and changes in topographical elevation and sensor parameters, among others. Radiometric distortions affect pixel-encoded radiance and are mainly caused by atmospheric conditions, scene illumination, sensor gains and satellite observation angles at the moment of the image acquisition.

Normally, it is necessary to first geometrically correct an image, and then correct its radiometry. However, without having prior knowledge of sensor geometric models and associated radiometric parameters, mutual information has not been widely used for remote sensing applications for several reasons.

For alignment of remote sensing images using manual methods, control points common to all images need to be carefully selected for geometric registration via a polynomial transformation. These processes are time-consuming and commonly introduce modeling errors, since the most reliable points may not be uniformly distributed.

Automated registration methods, because of the radiometric distortions of remotely sensed images, require that a transformation criterion (to maximize the mutual information when the images are geometrically aligned) has been previously determined using well known global optimization methods such as simulated annealing, genetic algorithm, and exhaustive search. Also, some algorithms break down when the source image is significantly different from the reference image in intensity and contrast variations (e.g., brightness reversals such as light/dark roads, reverse video, etc.), cross-sensor phenomenology, and non-linear differences (e.g., oblique viewing angles, earth curvature, dynamic scale variation, etc.). Therefore, the associated results lack efficiency, are not reliable, are computationally expensive, and are not suitable for real time applications, such as on-board unmanned aerial vehicle (UAV) mapping.

Absolute radiometric restoration of image time series from optical orbital sensors is a difficult task. This is because it is necessary to know all the conditions which influence radiometric distortion between the subject images, such as the sun's inclination angle, atmospheric conditions, sensor view angle and sensor gain. Such information may be not available for all acquired images by the same user, or for images acquired by different institutions, yet these data values are necessary to evaluate landscape changes in a multi-temporal series. While different from absolute radiometric restoration, the radiometric correction will calibrate all subject images to the radiometric conditions of the same reference image, but will not necessarily correct distortions from turbulence blur, aerosol blur, or path radiance.

Image registration based on the usual mutual information measure formulation contains a local maximum solution. Therefore, existing global optimization search algorithms seeking an optimal solution always get struck at the local maxima instead of reaching the global optimum solution, thus causing image misalignments.

There is a need for an image registration technique that overcomes the limitations of the prior art.

SUMMARY

A method includes: providing a reference image and a source image; using a wavelet transformation to produce a transformed reference image and a transformed source image; using the transformed reference image and the transformed source image to estimate affine transform parameters; using the reference image, the source image, and the affine transform estimates to maximize normalized mutual information between the reference image and the source image; and using the normalized mutual information to perform sub-pixel geo-spatial registration of the reference image and the source image to produce an output image.

In another aspect, an apparatus includes a sensor for producing a reference image and a source image; and a processor for using a wavelet transformation to produce a transformed reference image and a transformed source image, using the transformed reference image and the transformed source image to estimate affine transform parameters, using the reference image, the source image, and the affine transform estimates to maximize normalized mutual information between the reference image and the source image, and using the normalized mutual information to perform sub-pixel geo-spatial registration of the reference image and the source image.

DETAILED DESCRIPTION OF THE INVENTION

In a first aspect, the invention provides a method and apparatus for automated 2-D cross-sensor image-to-image geo-registration using minimum entropy (ME) algorithms that maximize mutual information of image intensity pairs when the images are geometrically aligned without requiring prior knowledge of geometric sensor models and radiometric parameters correction. The image intensity pairs may be a numerical value corresponding to how bright or dark each image's pixel at a corresponding position should be colored, for example, in the image data type "integer"; the value 0 corresponds to black and 255 corresponds to white; or in the image data type "double"; the value 0 corresponds to black and 1 corresponds to white.

In this description, the method is referred to as Image Registration by Normalized Mutual Information (IRNMI).

Figure 1:
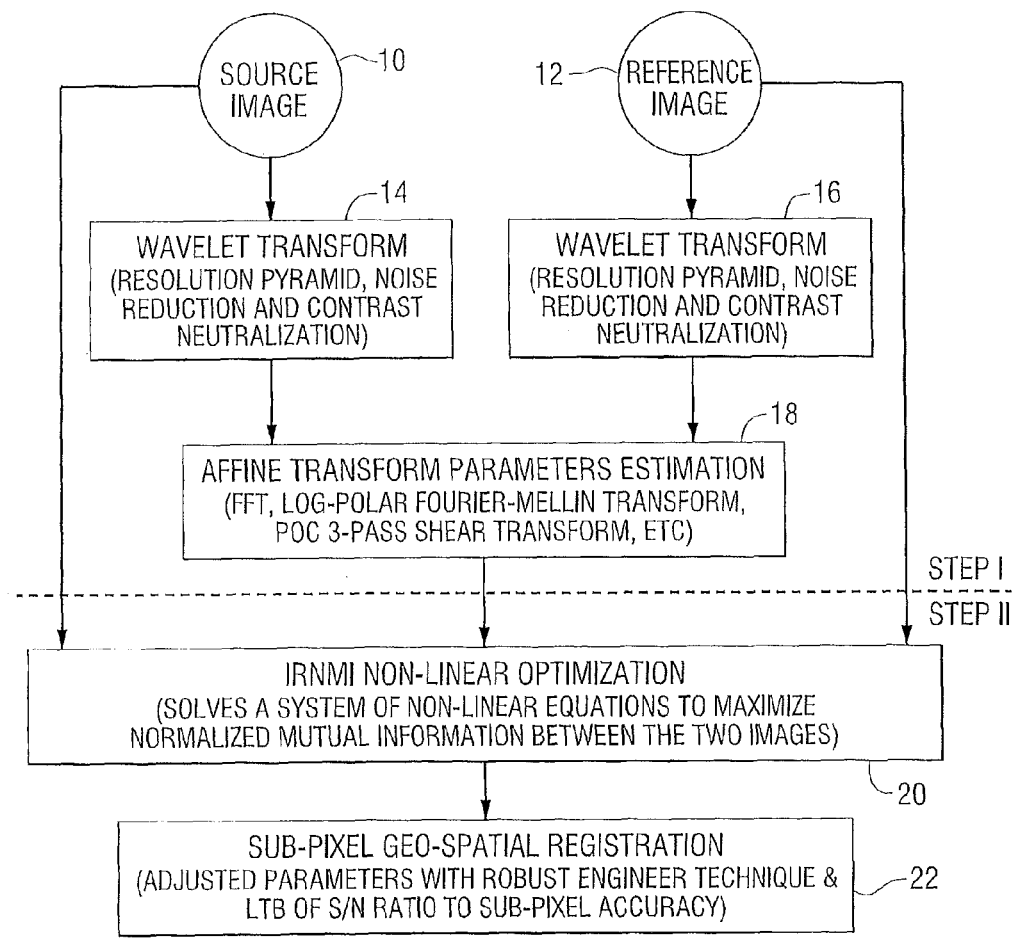
FIG. 1 is a flow diagram that depicts one embodiment of the method of the invention.

FIG. 1 is a flow diagram that depicts one embodiment of the method of the invention. The registration process depicted in FIG. 1 is subdivided into two steps. In the first step, a source image 10 and a reference image 12 are obtained. Each of these images is subjected to a wavelet transform as shown in blocks 14 and 16. Affine transform parameters are estimated as shown in block 18. Non-linear optimization is applied to the source image and the reference image using the affine transform estimation as an initial guess for solving a non-linear optimization process, as shown in block 20. Then sub-pixel geo-spatial registration is performed as shown in block 22.

The method provides automated image-to-image registration using minimum entropy techniques to maximize the normalized mutual information between images. The method allows the source image and the reference image to be acquired at different times, from different sensors, or different viewpoints, without depending upon the use of feature extraction, tie points finding, or prior knowledge of sensor models. The method also eliminates the tedious process of finding a set of common control points.

In one embodiment, the Image Registration by Normalized Mutual Information (IRNMI) algorithm applies a two-step optimization technique that: (1) reduces variability including brightness, contrast, and cross-sensor issues, and brings the images into vicinity pose, with affine parameters, using a combination of the Wavelet Transform and the Fourier-Mellin Transform in log-polar transformation using phase-only cross correlation spaces; and (2) calculates the transformed parameters via the modified Conjugate Gradient Descent optimization technique, employing variable time steps, which is fine-tuned to sub-pixel accuracy via the use of "robust engineering methods" (e.g., Taguchi Techniques). The method does not depend on prior identification of landmark points and/or a-priori distributions.

Similarity measures include: (1) cross correlation, if the assumption is that a linear relationship exists among the images; or (2) cross-entropy or mutual information, if the assumption is a non-linear relationship among the images.

Image registration is necessary in medical imaging in order to permit and complement an observation of a part of the human body from which an image has been obtained. For example, computed tomography (CT) and magnetic resonance imaging (MRI) primarily provide anatomic or structure information while single photon emission computed tomography (SPECT) and positron emission tomography (PET) provide functional and metabolic information. The combination of a functional or metabolic image with a structure or anatomical image may improve diagnostic accuracy. The feature space can be a set of landmarks, control points, a mask, or a prior (known) joint probability distribution function (Gaussian distribution, Parzen density estimation) in each of the images that are to be registered. Similarity measures include cross-correlation, if the assumption is a linear relationship among the images, or cross-entropy or mutual information, if the assumption is a non-linear relationship among the images. Under a restricted control environment, medical image registration can detect the registration parameter differences based on a rigid transformation of 6 degrees of freedom comprising, in a 3-dimensional (3-D) transformation, 3-translations in x-, y-, and z-coordinates and 3-rotations around x-, y-, and z-axes. If a 2-dimensional (2-D) transformation is used, 6 degrees of freedom comprise 2-translations in x- and y-coordinates, 2-rotations around x- and y-axes, and 2-scales in x- and y-axes. A shear parameter is not used in medical image registration.

In one aspect, the invention provides a method that automatically: (1) normalizes the cross-sensor image scenes prior to the application of minimum entropy; (2) determines full non-linear translation, rotation, scale, and shear affine transform parameter upper and lower boundaries to reduce the search space prior to the application of minimum entropy non-linear optimization; and (3) uses sub-pixel accuracy transforms based on optical flow between successive image pyramid differencing levels. The image pyramid is a data structure designed to support efficient scaled convolution through reduced image representation. It includes a sequence of copies of an original image in which both sample density and resolution are decreased in regular steps. Each of these three elements improves the accuracy of the registered image result, and supports a much more demanding tactical geo-spatial-intelligence application versus a simpler medical application. Prior to this invention, the inventors believe that minimum entropy had not been successfully applied in a tactical applications via the combination of features (1), (2) and (3) above.

Transformation is based on a rigid transformation of 6 degrees of freedom comprising: 3-translations in x-, y-, and z-coordinates and 3-rotations around x-, y-, and z-axes. If the 2-D transformation is used, then the 6 degrees of freedom comprise: 2-translations in x- and y-coordinates, 2-rotations around x- and y-axes, and 2-scales in the x- and y-axes. Shear transform parameter boundaries and values are not used in medical image registration. Shear is necessary for effective geo-registration of optical imagery captured at an oblique viewing angle.

In remote sensing image registration of satellite images from orbital sensors, intrinsic problems occur because of both geometric error and radiometric distortion misalignment of two or more images. Geometric errors are caused by position, size and orientation of a pixel being altered during the acquisition process. The causes of such geometric errors include earth rotation during the acquisition process, land curvature, platform speed and altitude variations, changes in topographical elevation and sensor parameters, among others. Radiometric distortions affect pixel-encoded radiance and are mainly caused by atmospheric conditions, scene illumination, sensor gains and satellite observation angles at the moment of the image acquisition. The method described herein does not depend on prior identification of landmark points and/or a-priori distributions. With modification of cross-entropy or mutual information, the method automatically (1) normalizes the cross-sensor image scenes prior to the application of minimum entropy, and (2) determines full non-linear translation, rotation, scale, and shear affine transform parameter upper and lower boundaries to reduce the search space prior to the application of minimum entropy non-linear optimization. Shear is used in remote sensing image registration for effective geo-registration of optical imagery captured at an oblique viewing angle.

In addition, the method uses (3) an image pyramid data structure designed to support efficient scaled convolution through reduced image representation. It includes a sequence of copies of an original image in which both sample density and resolution are decreased in regular steps. The use of sub-level accuracy transforms based on optical flow between successive image pyramid differencing levels, and each of these three elements, further improves the accuracy of the registered image result, and supports a much more demanding tactical geospatial-intelligence application versus the simpler medical application. The inventors believe that minimum entropy has not been previously successfully applied in a tactical Department of Defense (DoD) applications via the combination of features (1), (2) and (3) above.

In various aspects, the method solves several problems in the current state of the art. It avoids the need for using a time-consuming manual process for finding common tie points for both the source image and the reference image. It also avoids the need for prior knowledge of geometric sensor models and radiometric information that may not be available for image corrections.

It may further avoid algorithm breakdown and resolves image shadowing, speckle-like noises, image brightness, contrast, and scene illumination differences of the source image and the reference image.

It may also avoid large scale factor differences of the source image and the reference image in multi-resolution image registration. This is one of the primary drawbacks of using the previously known optimization-based approach which may fail if the two images are misaligned by even a moderate difference in scale, rotation, and translation.

The method may further avoid the need for an exhaustive search for non-linear optimal global transformation parameters; may also avoid the need for defining the derivative of the objective function; and provides an efficient search algorithm operating in near real time.

It also avoids local maxima misalignment and improves image registration within a sub-pixel accuracy.

In one embodiment, the method performs automatic image-to-image geo-registration, using minimum entropy (ME) techniques that maximize the normalized mutual information of the image intensity pairs when the images are geometrically aligned.

In one embodiment, the invention can be implemented using a registration algorithm that:

1. Performs automatic geo-spatial registration of source images to the reference image without a priori knowledge of the source image sensor models or radiometric parameters correction, such as the national imagery transmission format standard (NITFS), tagged record extensions (TRE) information, airborne, or commercial support data extension (SDE);

2. Performs automatic geo-spatial registration of source images to the reference image without a time-consuming process of defining a set of tie points or feature extract control points;

3. Performs automatic geo-spatial registration of source images to the reference image within sub-pixel accuracy, and avoids the local maxima that may cause misalignment between images;

4. Performs automatic geo-spatial registration of source images to the reference image providing near real time performance without the need for performing an exhaustive search for the optimal transformed parameters;

5. Performs automatic geo-spatial registration of source images to the reference image by a method which is not sensitive to the intensity and contrast difference or cross-sensor issues that cause the algorithm to break down; and/or 6. Performs automatic geo-spatial registration of source images to the reference image with potential applications in commercial products, including but not limited to the NGSC Advanced Precision Targeting RainStorm®.

The IRNMI algorithm does not require a common set of tie points or feature control points. It also does not require any a-priori knowledge of the source image sensor geometry model, the radiometric parameters for initial correction such as the national imagery transmission format standard (NITFS), tagged record extensions (TREs), airborne, or commercial support data extension (SDE), but benefits greatly when such data is available, and sufficiently reliable, to use as an initial estimate of the image pose.

The IRNMI algorithm applies Wavelet Transformation with a wavelet coefficient modification technique yielding invariance with respect to image shadowing, speckle-like noise removal, neutralized image brightness, contrast, scene illumination differences and also generates a multi-resolution representation of image.

The IRNMI algorithm constructs pyramidal wavelet domains using two filters; a low-pass and a high-pass decomposition filter to separate the frequency content of the input images in frequency bands of equal width. The output of the filters, each contain half the frequency content, but an equal amount of samples as the input signal. The two outputs together contain the same frequency content as the input images. However, the amount of data is doubled. Therefore down-sampling by a factor of two (extracting every other point from a sequence of points) is applied to the output images.

At each level of the wavelet decomposition, four new images of lower resolution (or lower scale) are created from the original N×N-pixel image. The size of these new images is reduced to ¼ of the original size, i.e., the new size is N/2×N/2. The new images are named according to the filters (L=low-pass or H=high-pass) which is applied to the original image in horizontal and vertical directions. For example, the LH image is a result of applying the low-pass filter in horizontal direction and high-pass filter in vertical direction. Thus, the four images produced from each decomposition level are LL, LH, HL, and HH. The LL image (approximation coefficient) is considered a reduced version of the original as it retains most details. The LH image (details-horizontal coefficient) contains horizontal edge features. The HL image (details-vertical coefficient) contains vertical edge features. The HH image (details-diagonal coefficient) contains high frequency information only and is typically noisy and is not useful for the registration.

The IRNMI algorithm applies minimum Shannon-entropy decomposition to determine optimum scale level of wavelet decomposition. For each decomposition level, a hard threshold is applied to vertical and horizontal coefficients using 3 standard deviations of a diagonal coefficient as the threshold approximation. The diagonal coefficient itself is zeroed out. Images can have many pixels with the same intensity, i.e., temporal aliasing; the component of the optical flow (from high-to-low scale) in the gradient direction is used to adjust the threshold.

To reconstruct the original image, the modified approximation coefficient and detail coefficients are up-sampled by inserting zeros between every element and convolved with two filters in the reverse process of down-sampling decomposition. With a wavelet coefficient modification technique, the IRNMI algorithm yielded invariance with respect to image shadowing, speckle-like noise removal, neutralized image brightness, contrast, scene illumination differences and also generates a multi-resolution representation of image.

The decomposition levels and down-sampling image pyramid resolves the large scale factors between the source and reference images and brings the two images within the effectiveness of the Fourier-Mellin Transformation for evaluation of the affine parameter bounds and generates a multi-resolution representation of images.

With the decomposition levels and down-sampling image pyramid to the optimized decomposition level (lowest resolution) of the reference image, the IRNMI algorithm applies a center-circular log-polar coordinate transformation template to estimate large scale and rotation differences between the reference and the source images. For every position in the source image, a circular region is selected and computed using a log-polar transformation. Maximum cross correlation is used to recover global scale in x-axis and global rotation in y-axis of log-polar transformation.

The decomposition levels and down-sampling image pyramid with log-polar coordinate transformation resolves the large scale factors between the source and reference images and brings the two images within the effectiveness of the Fourier-Mellin Transformation for evaluation the initial guess of the affine parameter bounds.

The wavelet decomposition technique with modified wavelet coefficients, provides noise reduction, shadowing and speckle-like noise removal, and neutralizes the image brightness, contrast and scene illumination difference effects. This step generates a multi-resolution representation of images.

The IRNMI algorithm applies the Fourier-Mellin Transformation (FMT) with a resulting spectrum, which is invariant in rotation, translation and scale. The Fourier Transform (FT) itself is translation invariant and its conversion to log-polar coordinates converts the scale and rotation differences to vertical and horizontal offsets that can be measured.

A second fast Fourier transform (FFT), called the Mellin Transform (MT), gives a transform-space image. Using phase-only cross correlation, rotation and scale can be measured. An additional 3-pass shear transformation in the algorithm brings the source image in the vicinity pose of the reference image, and automatically allows the computation of the lower and upper bound range for the 2-dimensional affine transformation parameters. The process makes the FMT perform within the limit used for the representation of the Fourier coefficients without distortion the affine parameters.

The IRNMI algorithm applies affine transformation, with the parameters including translation, rotation, scaling, and shearing. When the image is transformed, straight lines remain straight, and parallel lines remain parallel, but rectangles might become parallelograms. These parameters are:

Translation (shift); where $t_x$ specifies the displacement along the x axis, and $t_y$ specifies the displacement along the y axis.

Scale; where $s_x$ specifies the scale factor along the x axis, and $s_y$ specifies the scale factor along the y axis.

Shear; where $sh_x$ specifies the shear factor along the x axis, and $sh_y$ specifies the shear factor along the y axis.

Rotation; where $\theta$ specifies the angle of rotation.

The IRNMI algorithm applies fast Fourier transform (FFT), Fourier-Mellin transform and 3-pass shear rotation to estimate the initial guess for the optimization process. The process for one example is set forth below.

First, the IRNMI algorithm applies a fast Fourier transform (FFT) method to the reference image and the source image to recover a translation parameter based on the translation property of the Fourier transform, which is referred to as the Fourier shift theorem. The shift theorem guarantees that the phase of the cross-power spectrum is equivalent to the phase difference between the images. It is known that if two images $I_1$ and $I_2$ differ only by a shift, $(x_0, y_0)$; [i.e., $I_2(x, y)=I_1(x-x_0, y-y_0)$], then their Fourier transforms are related by the formula:

$$F_2(\xi,\eta)=F_1(\xi,\eta)*e^{-j2\pi(\xi x0+\eta y0)} \quad (1)$$

The cross-power spectrum (R ratio) of the two images $I_1$ and $I_2$ is defined as:

$$R = \frac{F_2(\xi, n)conj(F_2(\xi, n))}{abs(F_2(\xi, n))abs F_2(\xi, n)} = e^{j2\pi(\xi x0+ny0)} \quad (2)$$

Taking the inverse Fourier transform of the representation in the frequency domain, results in an impulse function which is approximately zero everywhere except for a small neighborhood around a single point. This single point is where the absolute value of the inverse Fourier transfer of R attains its maximum value. The peak of this location is exactly the displacement $(x_0; y_0)$ between the reference and the source images.

Second, the Fourier-Mellin Transform (FMT) is applied. After the source image has been constructed and corrected for displacement, the IRNMI algorithm applies the FMT to recover the scale and rotation by converting abs (F($\xi$, $\eta$)) from rectangular coordinates (x; y) to log-polar coordinates (log ($\rho$), $\theta$). The transformation makes it possible to represent both rotation and scaling as shifts. However, computing (log($\rho$), $\theta$) from the original rectangular grid leads to points that are not located exactly at points in the original grid. Thus, interpolation is needed to find a value of abs (F($\xi$, $\eta$)) on the desired grid. A bilinear interpolation is used in this implementation. The FMT steps are as follows:

1. Apply fast a Fourier transform (FFT) to the reference and the new modified source images; $F_1(\xi, \eta)$ and $F_2(\xi, \eta)$. Compute the absolute value of $F_1(\xi, \eta)$ and $F_2(\xi, \eta)$. Apply a high pass filter to the absolute values to remove low frequency noise. Transform the resulting values from rectangular coordinates to log-polar coordinates. Apply the FFT to both log-polar images and compute the cross-power spectrum ratio. Compute the invert FFT of the ratio.
2. Find the location $(log(\rho_0), \theta_0)$ of the maximum of absolute value of the inverse FFT ratio and obtain the values of rotation angle $(\theta_0)$ and scale $(\rho_0=base^{log(\rho 0)})$.
3. Construct a new image by applying reverse rotation and scaling to the modified source image.

Third, a 3-pass shear rotation is applied. To estimate the shear parameters, the IRNMI algorithm applies the 3-pass shear rotation from the FMT rotation angle $(\theta_0)$, where the rotation $(R_{rotation})$ matrix is decomposed into three separable matrices as follows.

$$R_{rotation} = \begin{vmatrix} \cos\theta & -\sin\theta \\ \sin\theta & \cos\theta \end{vmatrix} \quad (3)$$

$$= \begin{vmatrix} 1 & -\tan\theta/2 \\ 0 & 1 \end{vmatrix} \begin{vmatrix} 1 & 0 \\ \sin\theta & 1 \end{vmatrix} \begin{vmatrix} 1 & -\tan\theta/2 \\ 0 & 1 \end{vmatrix}$$

The Fourier-Mellin Transformation (FMT) with the additional 3-pass shear transformation technique provides minimization of the lower and the upper bounds of translation, rotation, shear and scale in x- and y-directions. Furthermore, the lower and upper bound ranges of the affine parameters are minimized because the noise and shadow variants of the images are removed, the intensity and the contrast of the images have been neutralized, and the large scale factors are resolved by the log-polar transform and the wavelet decomposition process. This process within the limits of the FMT provides distortion-free Fourier coefficients to be used for the affine recovery.

The IRNMI algorithm applies a non-linear optimization technique using a modified Conjugate Gradient Descent method with variable time steps utilizing a fast search algorithm for global optima in near real time operations. This approach accounts for the narrow range of lower/upper bounds of the affine transform parameters. Furthermore, the method does not require the derivative of the objective function.

The aim of IRNMI algorithm is to find a misalignment field u that spatially relates two images, such that the misalignment "source" image Isource(x+u(x)) matches the "reference" image Ireference(x) at every position x. The algorithm applies affine transformation parameters in order to maximize normalized mutual information (NMI) similarity measure. The approach is formulated as a standard minimization problem $$\hat{\mu} = \arg\min C(\mu; I_{reference}, I_{source}) \quad (1)$$

where the cost C function equals the negated NMI similarity metric, and $\mu$ represents the affine transform parameters vector that define the deformation field.

To determine the optimal set of affine parameters an iterative optimization strategy is employed $$\mu_{k+1} = \mu_k + a_k d_k, k=0,1,2, \quad (2)$$

where $d_k$ is the "search direction" at iteration k, and $a_k$ is a scalar gain factor controlling the step size along the search direction. The search directions and gain factors are chosen such that the sequence $\{\mu_k\}$ converges to a local minimum of the cost function.

The IRNMI algorithm applies each affine parameter with a different step size; translation step size ($\Delta x$, $\Delta y$), rotation step size ($\Delta r$), scale step size ($\Delta sx$, $\Delta sy$) and shear step size ($\Delta shx$, $\Delta shy$). Each parameter step is increased (+) or decreased (−) by each step size move to the direction of maximum normalized mutual information (NMI). The step size can be adjusted depending on whether a step results in a higher NMI, for example, if the NMI rises, the step size is increased by 10% to accelerate the convergence. If the NMI drops, overshooting a minimum, the step size is halved.

The modified non-linear Conjugate Gradient Descent method with variable time steps technique provides fast search capability for global optimal values for the affine parameters without the requirement of the derivative of the objective function.

The IRNMI algorithm applies "robust engineering methods" (e.g., Taguchi Techniques) to resolve the sub-pixel accuracy issue when the mutual information registration function contains a local maxima that causes image misalignment. The algorithm applies the larger-the-better (LTB) of the signal-to-noise (S/N) ratio criterion to optimize and adjust affine parameters for the best image registration within the sub-pixel accuracy.

There are four steps in robust engineer design using the Taguchi method as follows:

1. Problem Formulation. In this step begin by identifying the main function, then develop the P-diagram, define the ideal function and S/N ratio, and plan the experiments. The experiments involve changing the control, noise and signal factors.

2. Data Collection/Simulation. The experiment can be conducted with hardware or through simulation. For the purpose of experimentation it is not necessary to have a full-scale model of the product. To have an essential model of the product that adequately captures the design concept is more desirable and sufficient so, the experiments can be done more economically.

3. Factor Effects Analysis. Control factors are calculated in this step and results are analyzed to select the optimum setting of the control factors.

4. Prediction/Confirmation. Predict the performance of the product design under baseline and optimum settings of the control factors in order to validate the optimum conditions, by performing confirmation experiments and compare the results with the predictions. If the results agree with the predictions, then implement the process. Otherwise, redo the above steps.

The IRNMI algorithm applies a robust strategy to prevent problems through optimizing sub-pixel image registration process designs by creating five sub-modules as follows:

1. A Parameter Diagram (P-Diagram) is used to classify the variables associated with the process into signal factor (input), noise factor and control factor. The reference image and the source image are the signal input factor. Noise factors include brightness and contrast. Control factors are the affine parameters.

2. An Ideal Function is used to mathematically specify the ideal form of the signal-response relationship as created by the design concept for making a higher-level system work perfectly. The ideal function is the normalized mutual information. The algorithm applies the mean square deviation (MSD) for this calculation. The MSD is used to calculate the S/N values for each run.

3. A Quality Loss Function (QLF) is used to quantify the loss incurred by the user due to deviation from target performance. The algorithm applies the mean square deviation (MSD) instead of the QLF for this calculation. The MSD is used to calculate the S/N values for each run.

4. The Signal-to-Noise Ratio (S/N) is used for predicting the field quality through simulation process.

5. Orthogonal Arrays are used for gathering dependable information about control factors (design parameters) with a small number of simulation processes.

The simulation process in the IRNMI algorithm for sub-pixel registration accuracy using the mutual information of the image intensity values of corresponding points is maximal if the images are geometrically aligned. With two dimension affine parameters that transform registered image in x and y directions, the pixel intensity is sampled, a histogram is binned, and the probability and marginal entropy are evaluated. Similarly, the histogram, probability and marginal entropy are evaluated for the reference image. The joint entropy of both images are calculated and used to evaluate the normalized mean mutual information and signal-to-noise (S/N) ratio according to the larger-the-better approach for an orthogonal L8 array of two levels of noise factors for each affine control parameter. The optimal control factor set points are selected from the best value for the S/N ratio, and then used to realign the registered image to the reference one. The simulation steps are:

1. Two images are used for the experiment; the Reference image (R-image) and the registered image need to improve sub-pixel accuracy (X-image).

2. Apply affine transform parameters (Rotation, Scale-X, Scale-Y, Shear-X, Shear-Y, Shift-X, and Shift-Y) to the registered image, based on the control factors as designated on the orthogonal array table.

3. Apply noise factors for low and high contrast to the registered image.

4. Conduct simulation process as follows:
   Build the histogram from the image intensity using 256 bins for both the reference and registered image.
   Estimate the marginal probability and joint probability distribution of the reference and the registered images by calculating a joint histogram of the intensity value.
   Evaluate marginal and joint entropy.
   Evaluate the normalized mutual information mean of the two images.

5. The simulation process is performed based on a standard orthogonal layout; then iterate steps 3 and 4 with low and high intensity noise factors.

6. Data Analysis: using analysis of means (ANOM); calculate mean mutual information (MI), the mean square deviation (MSD), the S/N ratio for the larger-the-better (LTB) S/N ratios, and control factors plots, identify the optimal control factor set points from the best value for S/N ratio.

7. Finally, the results are optimized and validated using an additive model and the predictive equation. Confirmation experiments are performed with two cases: the optimal set point and a non-optimum which are not in the main experiment. Each of these runs is done with the same noise condition as the main experiment.

8. The results of the affine parameters are applied to construct sub-pixel registered images.

The "Robust Engineering methods" with the larger-the-better (LTB) of the signal-to-noise (S/N) ratio criterion avoid image misalignments due to the existing local maxima. The process also adjusts affine parameters to improve image registration within the sub-pixel accuracy.

The IRNMI algorithm performs geo-spatial registration of the reference image in a real world coordinate system (pixel-to-Latitude/Longitude).

Overall the IRNMI algorithm provides automated image-to-image registration without requiring a manual process of selecting common control points and prior geometric and radiometric correction of the sensors. The algorithm also provides sub-pixel accuracy image alignment in near real time operation.

The process can be implemented in two steps.

Step I: In the absence of a source image sensor model and/or sensor parameter information, the algorithm uses a sequential combination of (1) a Fast discrete Wavelet Transform for: radix-two down-sampling of the image pyramid, to resolve a large scale factor, and to provide robust noise removal, neutralized intensity, and contrast invariant image filtering; and (2) a mixed radix Fast Fourier-Mellin Transform in a log-polar coordinate space, phase-only cross correlation, and 3-pass shear transformation to automatically compute initial lower and upper bounds for affine parameters including translation, scale, rotation, and shear in x- and y-directions as starting values for the non-linear optimization process in the subsequent step. This step performs coarse registration by bringing the source image within the reference image vicinity pose without requiring correction of their a priori geometric sensor models and radiometric distortion.

Step II: In this step, the algorithm applies the minimum and the maximum affine parameter ranges from Step 1 as the lower and upper bounds to solve the non-linear equations using the modified Conjugate Gradient Descent algorithm with variable time steps to find the global maximum values of the affine transform parameters. In most cases, the global optimum is not reached, due to the existence of a local one. The algorithm applies "robust engineering methods" (e.g., Taguchi Techniques) based on the larger-the-better (LTB) of the signal-to-noise (S/N) ratio criterion to adjust the affine parameters around the local maxima condition and also to perform geo-spatial registration to the reference image within a sub-pixel accuracy.

The method can be implemented as a generalized algorithm for automated image-to-image registration that uses minimum entropy techniques to maximize the normalized mutual information between images. The methods allows the source image and the reference image to be acquired at different times, from different sensors, or different viewpoints, without depending upon the use of feature extraction, tie points finding, or prior knowledge of sensor models. The Image Registration by Normalized Mutual Information (IRNMI) algorithm applies a two-step optimization technique that: reduces variability including brightness, contrast, cross-sensors issues, and brings the images into vicinity pose, with affine parameters, using a combination of the Wavelet Transform and the Fourier-Mellin Transform in a log-polar transformation using phase-only cross correlation spaces; wherein the transformed parameters are calculated via the modified Conjugate Gradient Descent optimization technique, employing variable time steps, which is fine-tuned to sub-pixel accuracy via the use of the "robust engineering methods" (e.g., Taguchi Techniques).

In one aspect, this invention provides a method of Image Registration by Normalized Mutual Information (IRNMI), which provides for automated 2-D cross-sensor image-to-image geo-registration using minimum entropy (ME) algorithms that maximize mutual information of the image intensity pairs when the images are geometrically aligned, without the requirement of priori knowledge of geometric model of sensors and radiometric parameters correction. FIG. 1 is a flow diagram that depicts one embodiment of the method.

Figure 2:
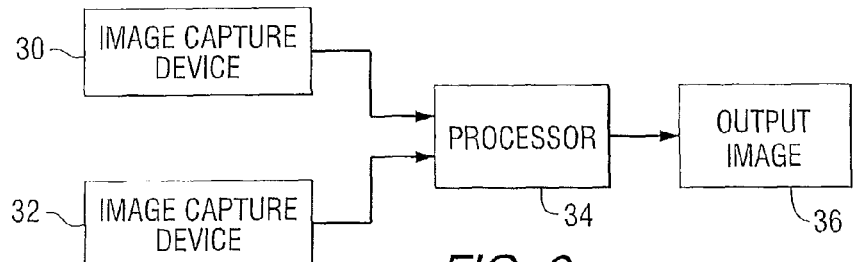
FIG. 2 is a block diagram of a system that can be used to perform the method depicted in FIG. 1.

FIG. 2 is a block diagram of a system 30 that can be used to perform the method depicted in FIG. 1. The system includes two image capture devices 32 and 34, which may be for example, cameras or other types of image sensors. While two image capture devices are shown in this example, it should be understood that a single image capture device could be used to capture images at different locations and/or different times. The images are sent to a processor 36 that performs the image processing described above to transform the image data and produce an output image 38. The processor can be a computer or other processor programmed to perform the described image processing. Alternatively, additional circuitry may be included to perform at least some of the signal processing, such as for example various filters.

While the invention has been described in terms of various embodiments, it will be apparent to those skilled in the art that changes can be made to the disclosed examples without departing from the scope of the invention as set forth in the following claims.

What is claimed is:

1. A method comprising:
providing a reference image and a source image to a processor;
wherein the processor uses a wavelet transformation to produce a transformed reference image and a transformed source image; uses the transformed reference image and the transformed source image to estimate affine transform parameters; uses the reference image, the source image, and the affine transform estimates to maximize normalized mutual information between the reference image and the source image; uses the normalized mutual information to perform sub-pixel geo-spatial registration of the reference image and the source image to produce an output image; and applies minimum and maximum affine parameter ranges as lower and upper bounds to solve non-linear equations using a modified Conjugate Gradient Descent algorithm with variable time steps to find the global maximum values of the affine transform parameters.

2. A method comprising:
providing a reference image and a source image to a processor;
wherein the processor uses a wavelet transformation to produce a transformed reference image and a transformed source image; uses the transformed reference image and the transformed source image to estimate affine transform parameters; uses the reference image, the source image, and the affine transform estimates to maximize normalized mutual information between the reference image and the source image; uses the normalized mutual information to perform sub-pixel geo-spatial registration of the reference image and the source image to produce an output image; and uses a sequential combination of a fast discrete Wavelet Transform for radix-two down-sampling of an image pyramid, a mixed radix Fast Fourier-Mellin Transform in a log-polar coordinate space, a phase-only cross correlation, and a 3-pass shear transformation to automatically compute initial lower and upper bounds for the affine parameters to produce the transformed reference image and the transformed source image.

3. The method of claim 1, wherein the affine parameters include:

translation, scale, rotation, and shear in x-direction and y-direction as starting values for a non-linear optimization process.

4. The method of claim 1, wherein the processor applies Taguchi Techniques based on a larger-the-better of signal-to-noise ratio criterion to adjust the affine parameters around a local maxima condition and to perform geo-spatial registration to the reference image within a sub-pixel accuracy.

5. The method of claim 1, wherein the reference image and a source image are acquired by different sensors, at different times, or from different viewpoints.

6. A method comprising:

providing a reference image and a source image to a processor;

wherein the processor uses a wavelet transformation to produce a transformed reference image and a transformed source image; uses the transformed reference image and the transformed source image to estimate affine transform parameters; uses the reference image, the source image, and the affine transform estimates to maximize normalized mutual information between the reference image and the source image; uses the normalized mutual information to perform sub-pixel geo-spatial registration of the reference image and the source image to produce an output image; and uses two filters to separate frequency content of the reference image and source image in frequency bands of equal width; and wherein outputs of the filters, each contain half the frequency content, but an equal amount of samples as the reference image and source image.

7. The method of claim 1, wherein the output image is down-sampled by a factor of two.

8. An apparatus comprising:

a sensor for producing a reference image and a source image; and a processor for using a wavelet transformation to produce a transformed reference image and a transformed source image, using the transformed reference image and the transformed source image to estimate affine transform parameters, using the reference image, the source image, and the affine transform estimates to maximize normalized mutual information between the reference image and the source image, and using the normalized mutual information to perform sub-pixel geo-spatial registration of the reference image and the source image, wherein minimum and maximum affine parameter ranges are applied as lower and upper bounds to solve non-linear equations using a modified Conjugate Gradient Descent algorithm with variable time steps to find the global maximum values of the affine transform parameters.

9. An apparatus comprising:

a sensor for producing a reference image and a source image; and a processor for using a wavelet transformation to produce a transformed reference image and a transformed source image, using the transformed reference image and the transformed source image to estimate affine transform parameters, using the reference image, the source image, and the affine transform estimates to maximize normalized mutual information between the reference image and the source image, and using the normalized mutual information to perform sub-pixel geo-spatial registration of the reference image and the source image, wherein the processor uses a sequential combination of a fast discrete Wavelet Transform for radix-two down-sampling of an image pyramid, a mixed radix Fast Fourier-Mellin Transform in a log-polar coordinate space, a phase-only cross correlation, and a 3-pass shear transformation to automatically compute initial lower and upper bounds for the affine parameters.

10. The apparatus of claim 8, wherein the affine parameters include:

translation, scale, rotation, and shear in x-direction and y-direction as starting values for a non-linear optimization process.

11. The apparatus of claim 8, wherein the processor further applies Taguchi Techniques based on a larger-the-better of signal-to-noise ratio criterion to adjust the affine parameters around a local maxima condition and to perform geo-spatial registration to the reference image within a sub-pixel accuracy.

* * * * *